US012089535B2

(12) United States Patent
Mezzomo et al.

(10) Patent No.: US 12,089,535 B2
(45) Date of Patent: Sep. 17, 2024

(54) REMOVABLE INSERT FOR A THRESHING ROTOR CAGE

(71) Applicant: CNH Industrial America LLC, New Holland, PA (US)

(72) Inventors: Francisco Mezzomo, Bettendorf, IA (US); Michael J. Matway, Litchfield, IL (US); Travis Ohms, Davenport, IA (US); Craig E. Murray, Davenport, IA (US)

(73) Assignee: CNH Industrial America LLC, Holland, PA (US)

( * ) Notice: Subject to any disclaimer, the term of this patent is extended or adjusted under 35 U.S.C. 154(b) by 903 days.

(21) Appl. No.: 16/360,878

(22) Filed: Mar. 21, 2019

(65) Prior Publication Data

US 2020/0296895 A1    Sep. 24, 2020

(51) Int. Cl.
*A01F 12/18*      (2006.01)
*A01F 7/06*       (2006.01)
(Continued)

(52) U.S. Cl.
CPC .............. *A01F 12/181* (2013.01); *A01F 7/06* (2013.01); *A01F 7/062* (2013.01); *A01F 12/184* (2013.01);
(Continued)

(58) Field of Classification Search
CPC ............... A01F 12/81; A01F 2012/188; A01F 12/00–12/60; A01F 7/00–7/70
See application file for complete search history.

(56) References Cited

U.S. PATENT DOCUMENTS

| 1,956,329 A | * | 4/1934 | Moureaux | ............... A01F 12/44 |
| | | | | 209/153 |
| 2,053,148 A | * | 9/1936 | James | ....................... A01F 7/06 |
| | | | | 460/67 |

(Continued)

FOREIGN PATENT DOCUMENTS

| EP | 2064941 A1 | 6/2009 |
| GB | 2051542 A | 1/1981 |
| WO | 2018/089774 A1 | 5/2018 |

OTHER PUBLICATIONS

Extended European Search Report for EP Application No. 20161628.1 dated Sep. 25, 2020 (six pages).

*Primary Examiner* — Thomas B Will
*Assistant Examiner* — Madeline I Runco
(74) *Attorney, Agent, or Firm* — Peter K. Zacharias; Rebecca L. Henkel; Rickard K. DeMille (57) ABSTRACT

A threshing and separating system for an agricultural harvester includes a rotor configured to rotate about a rotor axis, a rotor cage at least partially enclosing the rotor and including a tailings return inlet formed therein and configured to couple to a tailings return elevator and an insert opening formed therein that is at least partially circumferentially aligned with the tailings return inlet relative to the rotor axis, at least one concave coupled to the rotor cage and defining a plurality of concave perforations, and a threshing insert removably coupled to the rotor cage and including at least one mounting opening. The threshing insert at least partially covers the insert opening and is positioned such that material from the tailings return inlet travels past the threshing insert before reaching the concave.

20 Claims, 7 Drawing Sheets

(51) Int. Cl.
  *A01F 12/24* (2006.01)
  *A01F 12/26* (2006.01)
  *A01F 12/52* (2006.01)

(52) U.S. Cl.
  CPC ............ *A01F 12/185* (2013.01); *A01F 12/24* (2013.01); *A01F 12/26* (2013.01); *A01F 12/52* (2013.01); *A01F 2009/00* (2013.01); *A01F 12/182* (2013.01)

(56) References Cited

U.S. PATENT DOCUMENTS

| | | | | |
|---|---|---|---|---|
| 2,262,453 A * | 11/1941 | Dray | .................. | A01F 12/444 460/119 |
| 2,305,964 A * | 12/1942 | Harrison | .................. | A01F 12/24 460/109 |
| 2,612,742 A * | 10/1952 | Heth | .................. | A01F 12/444 56/13.3 |
| 3,202,154 A * | 8/1965 | Viebrock | .................. | A01F 12/00 460/13 |
| 3,247,855 A | 4/1966 | Kepkay | | |
| 3,529,645 A * | 9/1970 | Pauw De | .................. | A01F 7/06 241/101.2 |
| 3,568,682 A * | 3/1971 | Knapp | .................. | A01F 12/24 460/108 |
| 3,696,815 A * | 10/1972 | Rowland-Hill | .......... | A01F 7/06 460/69 |
| 3,703,802 A * | 11/1972 | Wrestler | .............. | A01F 12/442 56/13.3 |
| 3,847,160 A * | 11/1974 | De Coene | ......... | A01D 41/1208 460/97 |
| 3,976,084 A * | 8/1976 | Weber | .................. | A01F 12/18 460/14 |
| 3,995,645 A | 12/1976 | Rowland-Hill | | |
| 4,177,820 A * | 12/1979 | Rowland-Hill | .......... | A01F 7/06 460/66 |
| 4,249,543 A | 2/1981 | Rowland-Hill | | |
| 4,250,896 A * | 2/1981 | Wagstaff | .................. | A01F 7/06 460/70 |
| 4,265,077 A * | 5/1981 | Peters | .................. | A01F 12/444 460/98 |
| 4,441,511 A * | 4/1984 | Schroeder | .............. | A01F 12/52 460/13 |
| 4,441,513 A * | 4/1984 | Herwig | ................ | A01D 41/127 250/223 R |
| 4,470,420 A * | 9/1984 | Hanaway | ................ | A01F 12/52 460/13 |
| 4,474,188 A * | 10/1984 | Kashino | .................. | A01F 12/52 460/13 |
| 4,497,162 A * | 2/1985 | Eguchi | .................. | A01D 67/00 460/119 |
| 4,711,075 A * | 12/1987 | Strong | .................. | A01F 12/24 460/110 |
| 4,774,968 A | 10/1988 | Spanlang | | |
| 5,041,059 A * | 8/1991 | Ricketts | ................ | A01F 12/446 460/101 |
| 5,498,206 A | 3/1996 | Underwood et al. | | |
| 6,342,006 B1 * | 1/2002 | Bauch | ................ | A01D 41/1276 460/4 |
| 7,762,877 B2 | 7/2010 | Pope et al. | | |
| 7,934,982 B2 * | 5/2011 | Pope | ....................... | A01F 12/52 460/14 |
| 8,829,389 B2 | 9/2014 | Flickinger et al. | | |
| 2004/0137973 A1 * | 7/2004 | Schmidt | .................. | A01F 12/52 460/13 |
| 2006/0025188 A1 * | 2/2006 | Schmidt | .................. | A01F 12/52 460/114 |
| 2009/0075708 A1 * | 3/2009 | Weichholdt | ............. | A01F 12/24 460/59 |
| 2017/0150678 A1 * | 6/2017 | Li | ........................... | A01D 41/12 |
| 2017/0325407 A1 * | 11/2017 | Kemmerer | ............. | A01F 7/067 |
| 2018/0160627 A1 * | 6/2018 | Kemmerer | ............. | A01F 7/062 |
| 2018/0368324 A1 * | 12/2018 | Lauer | ..................... | A01F 12/24 |
| 2021/0068344 A1 * | 3/2021 | Biggerstaff | ............. | A01F 12/26 |

\* cited by examiner

REMOVABLE INSERT FOR A THRESHING ROTOR CAGE

FIELD OF THE INVENTION

The present invention pertains to an agricultural harvester and, more specifically, to a rotor cage of an agricultural harvester.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Certain crops are difficult to fully thresh and separate. When harvesting such crops, the risk of unthreshed crop material reaching the grain tank increases. Unthreshed crop material in the grain tank must be further processed after delivery or, more often, is discarded, which increases cost and/or lowers crop yield.

What is needed in the art is a way to decrease the risk of unthreshed crop material reaching the grain tank.

SUMMARY OF THE INVENTION

Exemplary embodiments provided in accordance with the present disclosure provide a threshing insert removably coupled to a rotor cage of a threshing and separating system such that material entering the rotor cage from a tailings return inlet travels past the threshing insert before reaching a concave coupled to the rotor cage.

In some exemplary embodiments provided in accordance with the present disclosure, a threshing and separating system for an agricultural harvester includes a rotor configured to rotate about a rotor axis, a rotor cage at least partially enclosing the rotor and including a tailings return inlet formed therein and configured to couple to a tailings return elevator and an insert opening formed therein that is at least partially circumferentially aligned with the tailings return inlet relative to the rotor axis, at least one concave coupled to the rotor cage and defining a plurality of concave perforations, and a threshing insert removably coupled to the rotor cage and including at least one mounting opening. The threshing insert at least partially covers the insert opening and is positioned such that material from the tailings return inlet travels past the threshing insert before reaching the concave.

In some exemplary embodiments provided in accordance with the present disclosure, an agricultural harvester includes a chassis, a cleaning system carried by the chassis and including at least one sieve and a tailings return elevator with an inlet located below the at least one sieve; and a threshing and separating system carried by the chassis. The threshing and separating system includes a rotor configured to rotate about a rotor axis; a rotor cage at least partially enclosing the rotor and including a tailings return inlet formed therein that is coupled to the tailings return elevator and an insert opening formed therein that is at least partially circumferentially aligned with the tailings return inlet relative to the rotor axis, at least one concave coupled to the rotor cage and defining a plurality of concave perforations; and a threshing insert removably coupled to the rotor cage and including at least one mounting opening. The threshing insert at least partially covers the insert opening and is positioned such that material from the tailings return inlet travels past the threshing insert before reaching the concave.

In some exemplary embodiments, a method for adjusting threshing performance of a threshing and separating system of an agricultural harvester is provided. The threshing and separating system includes a rotor defining a rotor axis and a rotor cage at least partially enclosing the rotor and having a tailings return inlet and an insert opening at least partially covered by a threshing insert and at least partially circumferentially aligned with the tailings return inlet relative to the rotor axis. The method includes removing the threshing insert to uncover the insert opening and mounting a replacement threshing insert to at least partially cover the insert opening. Threshing performance of the threshing and separating system is altered by mounting the replacement threshing insert.

One possible advantage that may be realized by exemplary embodiments disclosed herein is that the threshing insert can be equipped with threshing bars and positioned under the tailings return inlet, where threshing and separation does not normally occur, to provide additional threshing for crops that are difficult to thresh.

Another possible advantage that may be realized by exemplary embodiments disclosed herein is that the threshing insert can be equipped with bushings that are flush with an interior surface of the rotor cage when additional threshing is not needed.

Yet another possible advantage that may be realized by exemplary embodiments disclosed herein is that different threshing inserts can be used to conveniently adjust threshing performance of the threshing and separating system.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
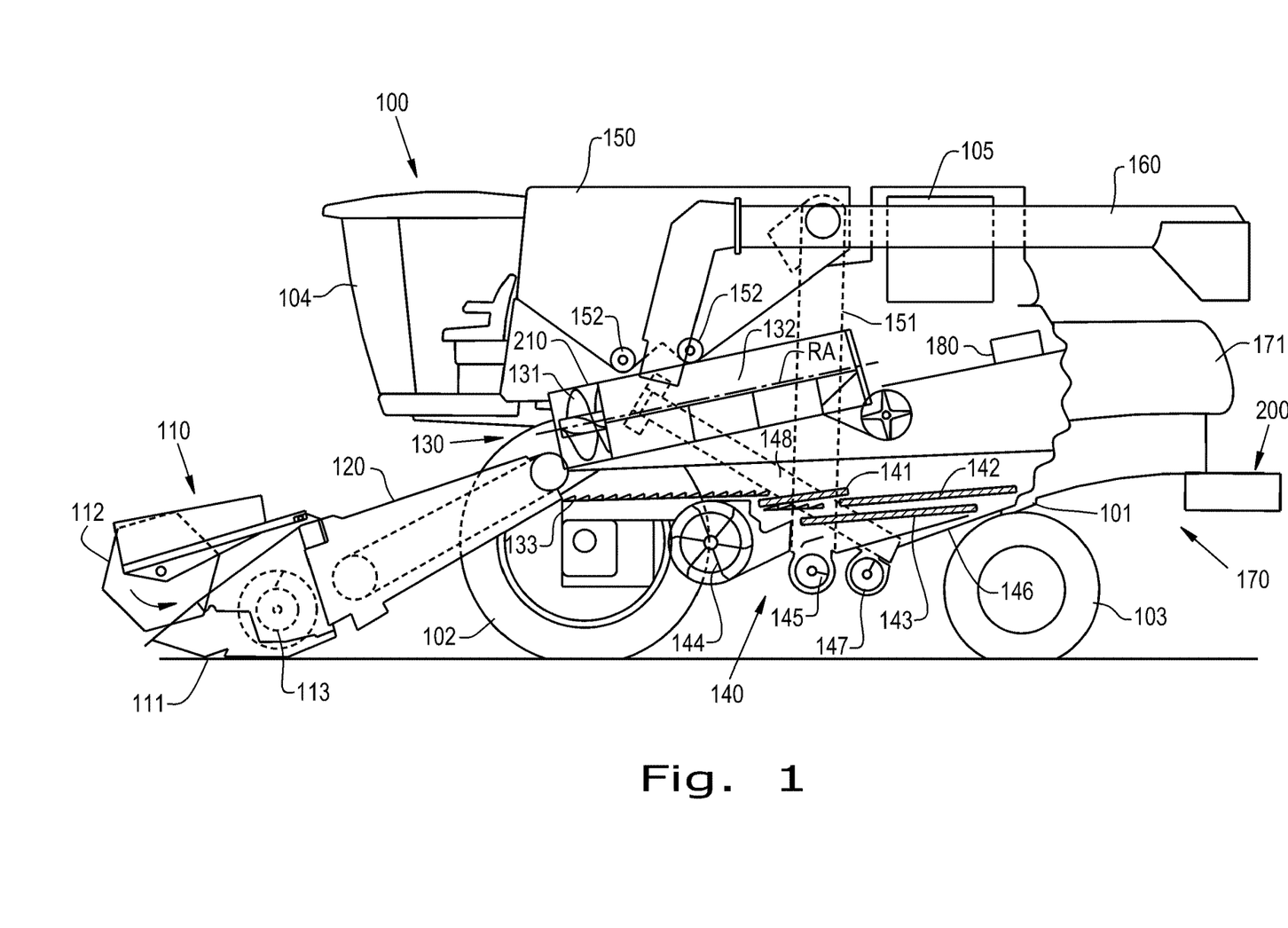
FIG. 1 illustrates a side view of an exemplary embodiment of an agricultural vehicle, the agricultural vehicle comprising a threshing and separating system that is provided in accordance with an exemplary embodiment of the present disclosure.

Referring now to the drawings, and more particularly to FIG. 1, there is shown an embodiment of an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing rotor 131 at least partially enclosed by a rotor cage 210 and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue management system 170 of combine 100. Optionally, the chaff and/or straw can proceed through a chopper 180 to be further processed into even smaller particles before discharge out of the combine 100 by a spreader assembly 200. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and tailings return elevator 148, which has an inlet below the sieves 141, 142, 143, to the threshing and separating system 130 for repeated cleaning action, as described further herein. A pair of grain tank augers 152 at the bottom of grain tank 150 convey the clean grain laterally within grain tank 150 to unloader 160 for discharge from combine 100.

Figure 2:
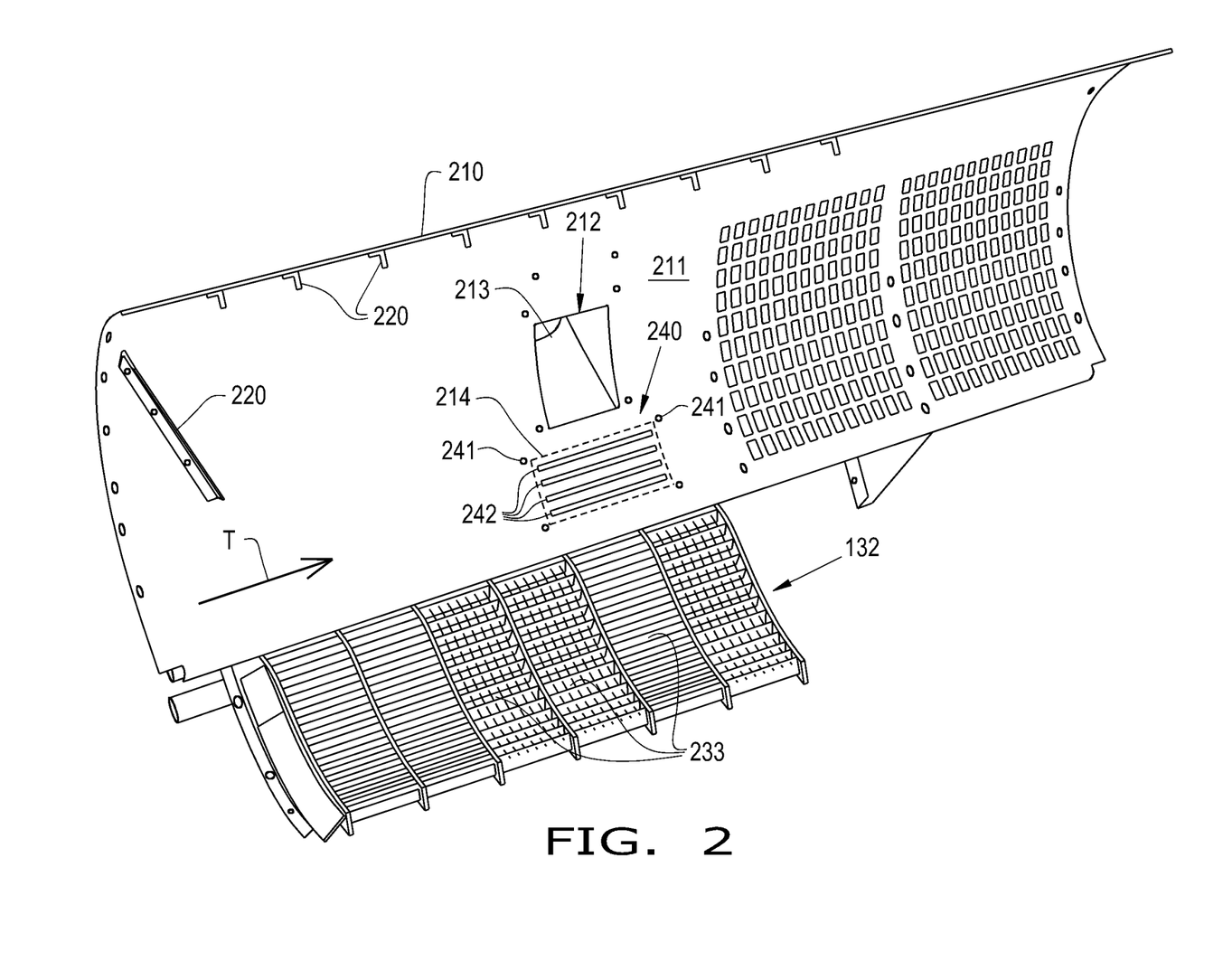
FIG. 2 illustrates an interior sectional view of a rotor cage of the threshing and separating system of FIG. 1 with a threshing insert mounted thereto, in accordance with an exemplary embodiment of the present disclosure.
Figure 3:
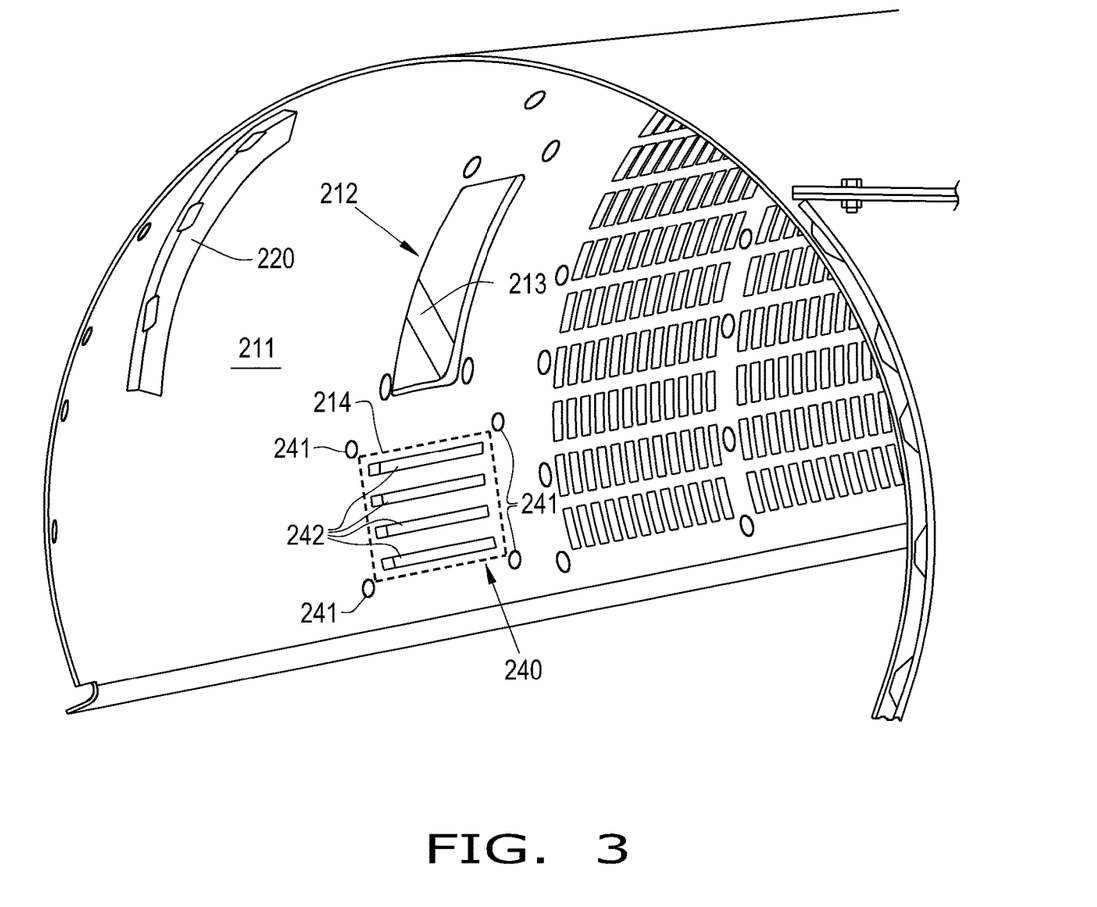
FIG. 3 illustrates another interior sectional view of the rotor cage illustrated in FIGS. 1-2 without a concave coupled thereto.

Referring now to FIGS. 2-3, the rotor cage 210 of the threshing and separating system 130 is illustrated in further detail. As previously described, the rotor cage 210 at least partially surrounds the threshing rotor 131, as illustrated in FIG. 1. The rotor cage 210 may have a generally cylindrical shape that extends in parallel to a rotor axis RA (illustrated in FIGS. 1 and 5), which the threshing rotor 131 is configured to rotate about during operation. A plurality of helical vanes 220 may be disposed on an interior surface 211 of the rotor cage 210 to direct crop material during rotation of the threshing rotor 131, as is known. In some embodiments, the vanes 220 are shaped so crop material travels in a travel direction, illustrated as an arrow T in FIG. 2, during rotation of the threshing rotor 131.

The concave 132, which may be formed of one or more concave modules, is coupled to the rotor cage 210 and includes a plurality of concave perforations 233. As the threshing rotor 131 rotates, crop material is pressed against the concave 132. Threshed and separated crop material passes through the perforations 233 and travels to the cleaning system 140 for further cleaning.

Tailings, which need further cleaning, are returned to the threshing and separating system 130 by the tailings return elevator 148. The rotor cage 210 has a tailings return inlet 212 formed therein that is coupled to the tailings return elevator 148 and provides an entryway for tailings back into the threshing and separating system 130 for additional threshing. In some embodiments, the tailings return elevator 148 is an auger or similar arrangement. As illustrated in FIGS. 2-3, as well as FIG. 4, the tailings return inlet 212 may include an angled guide lip 213 that is exterior of the rotor cage 210. The tailings return elevator 148 may have an outlet that is coupled to the guide lip 213, with tailings being dumped into the guide lip 213 and through the tailings return inlet 212 into the rotor cage 210. Once the tailings enter the rotor cage 210, the tailings may be pressed by the threshing rotor 131 against the concave 132 for additional threshing and separating.

It has been found that certain crops and crop conditions require more aggressive threshing and separating conditions to completely thresh and separate the crop material. Harder crops are prone to being unthreshed and/or unseparated after passing through the threshing and separating system 130, even after multiple passes. This increases the risk of unclean crop material reaching the grain tank 150, which lowers harvesting efficiency.

Figure 4:
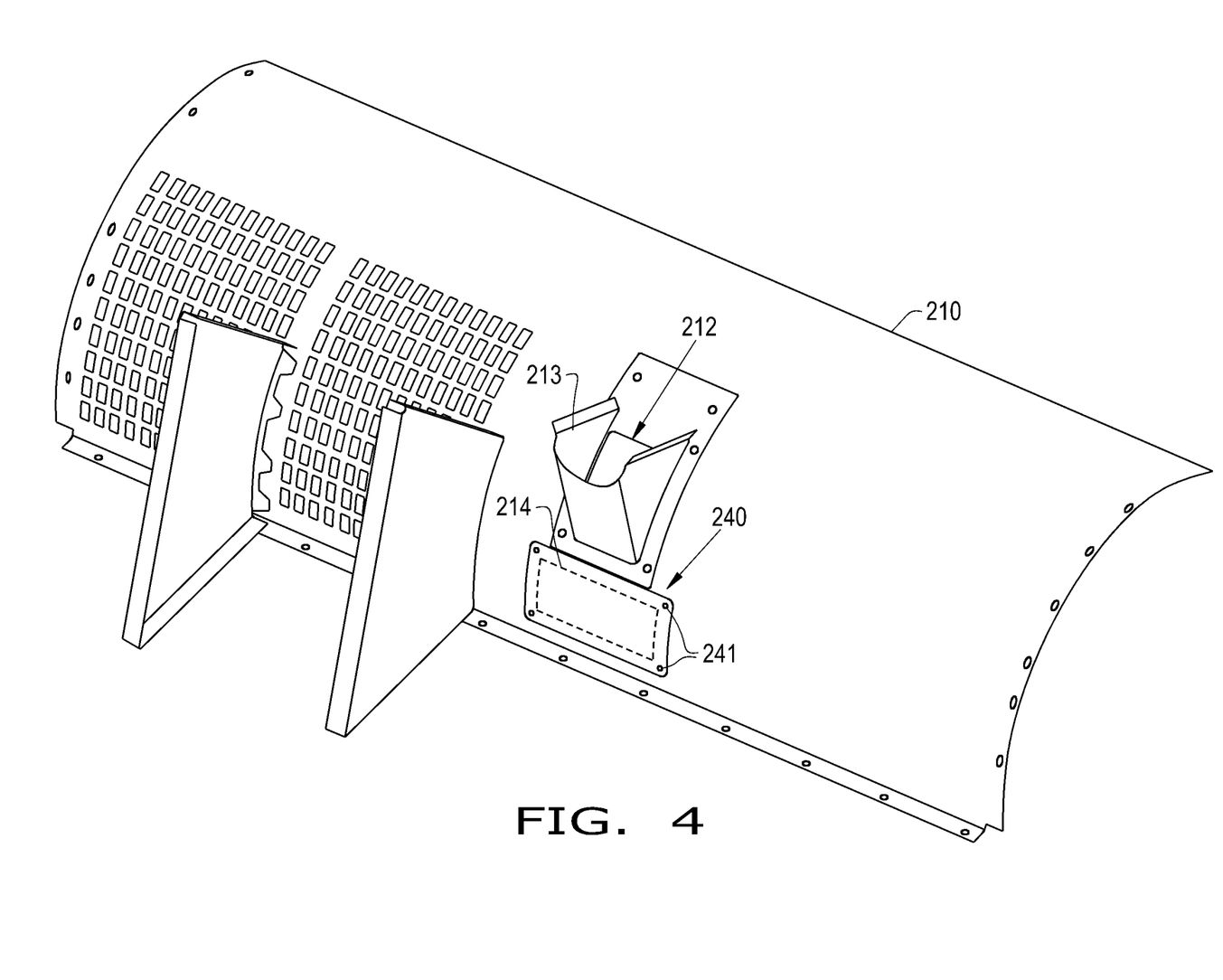
FIG. 4 illustrates an exterior sectional view of the rotor cage illustrated in FIGS. 1-3.
Figure 5:
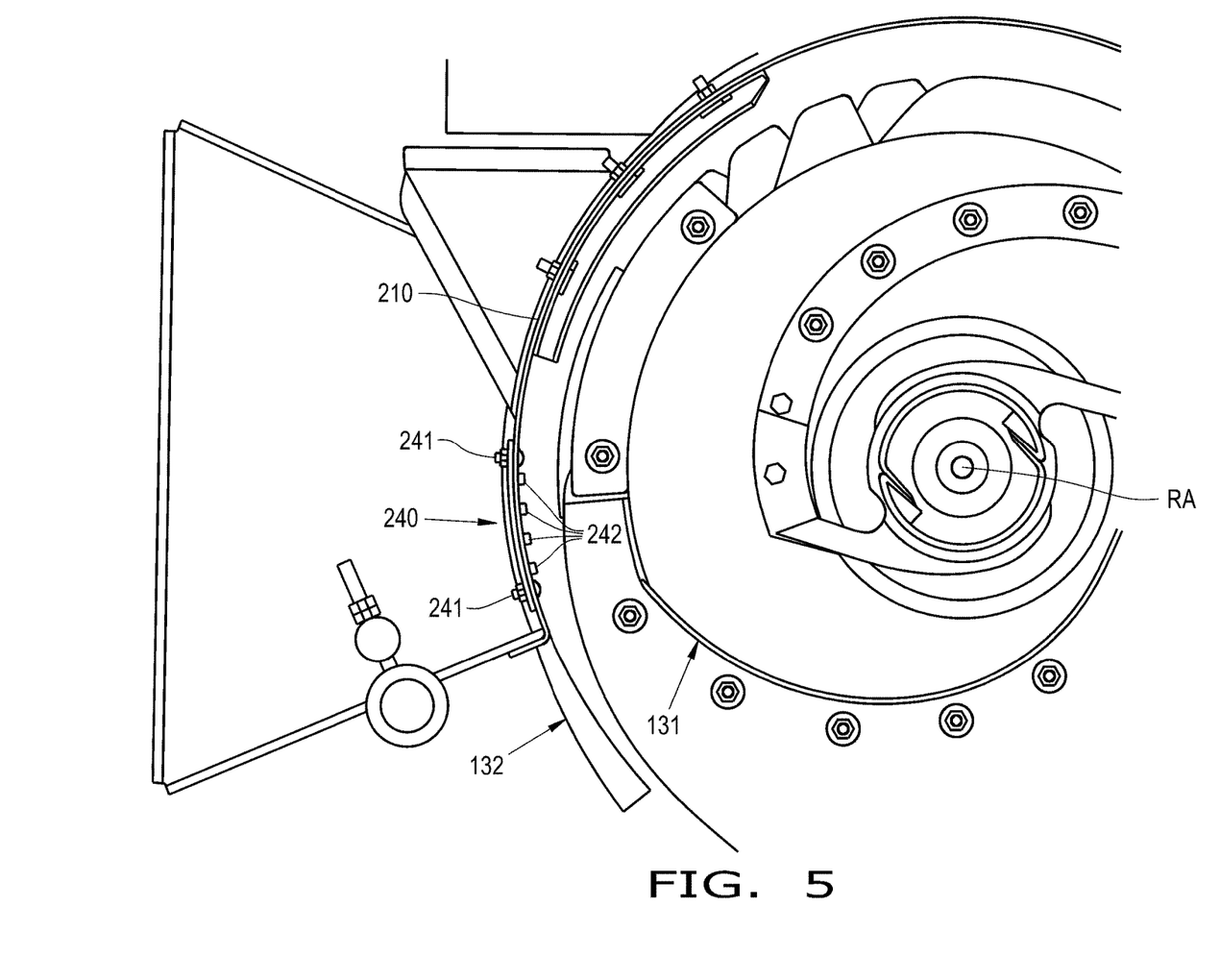
FIG. 5 illustrates a front sectional view of the threshing and separating system of FIG. 1.

With further reference to FIGS. 2-4 as well as FIG. 5, an exemplary embodiment of a threshing insert 240 provided in accordance with the present disclosure is illustrated. The threshing insert 240 is removably coupled to the rotor cage 210 and at least partially covers an insert opening 214 formed in the rotor cage 210, the significance of which is described further herein. In some embodiments, the threshing insert 240 comprises a curved sheet of material, such as a metal or a polymer, that substantially conforms to the shape of the rotor cage 210. The threshing insert 240 may be removably mounted to the rotor cage 210 by one or more fasteners 241, such as screws. In some embodiments, the threshing insert 240 is hingedly coupled to the rotor cage 210 and may be pivoted away from the rotor cage 210.

The threshing insert 240 is positioned to be circumferentially aligned with the tailings return inlet 212, relative to the rotor axis RA, such that material from the tailings return inlet 212, i.e., previously threshed tailings, travel past the threshing insert 240 before reaching the concave 132. The material may travel past the threshing insert 240 due to gravity as well as the threshing rotor 131 moving the material against the interior surface 211 of the rotor cage 210 during rotation of the threshing rotor 131 about the rotor axis RA.

The threshing insert 240 may include one or more threshing bars 242, illustrated as four threshing bars 242, that extend through the insert opening 214 such that material from the tailings return inlet 212 travels past the threshing bars 242 before reaching the concave 132. In some embodiments, the threshing bars 242 are formed of keystock or a similar material that is welded to the threshing insert 240. Alternatively, the threshing bars 242 can be removably mounted to the threshing insert 240. In some embodiments, the threshing bars 242 extend generally parallel to the rotor axis RA so crop material is forced against and into the spaces between the threshing bars 242 as the threshing rotor 131 rotates about the rotor axis RA. A portion of the interior surface 211 of the rotor cage 210 between the insert opening 214 (and the mounted threshing bars 242) and the concave 132 may be smooth, i.e., define a generally uninterrupted round surface, so minimal, if any, threshing occurs between the threshing bars 242 and the concave 132.

Placing the threshing bars 242 between the tailings return inlet 212 and the concave 132 allows for threshing of material from the tailings return inlet 212 against the threshing bars 242 before the threshing rotor 131 moves the material against the concave 132. In this sense, the threshing bars 242 can provide additional threshing of material that is returned to the threshing and separating system 130 in a location where material is not normally threshed and separated. The additional threshing can decrease the risk of unthreshed and/or unseparated material reaching the cleaning system 140, and thus the risk of unclean material reaching the grain tank 150. Further, the location of the threshing bars 242 when the threshing insert 240 is mounted does not block off open area of the concave 132 or reduce separating capacity of the system 130. Thus, providing the threshing insert 240 in hard thresh crop conditions can improve threshing performance of the threshing and separating system 130 to reduce the amount of unthreshed and unclean crop that makes it to the grain tank 150.

Figure 6:
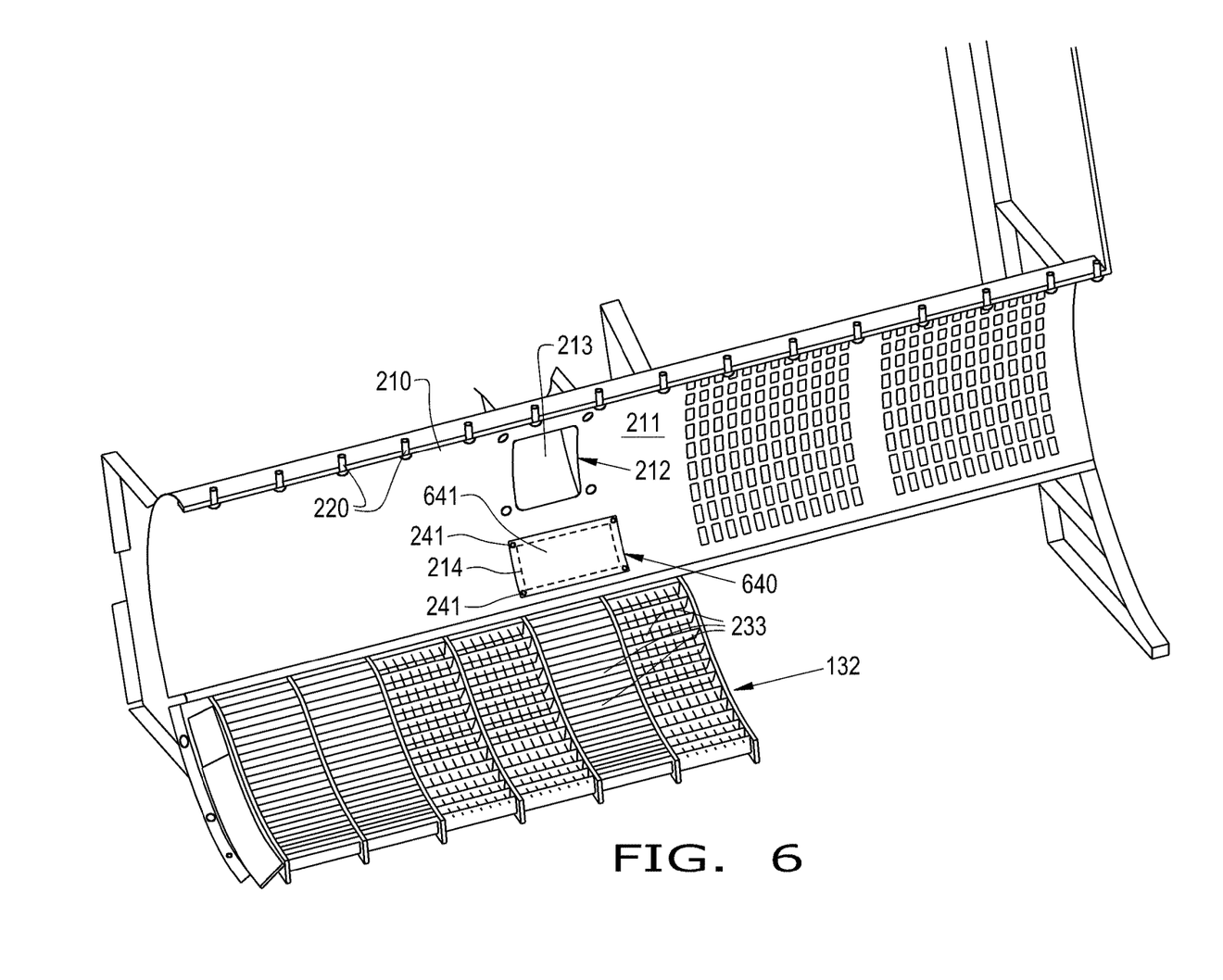
FIG. 6 illustrates the threshing and separating system of FIGS. 1-5 with another exemplary embodiment of a threshing insert mounted to the rotor cage.

When a hard thresh is not desired, and referring now to FIG. 6, the threshing insert 240 illustrated in FIGS. 2-5 may be removed and replaced by another exemplary embodiment of a threshing insert 640. The threshing insert 240 may be removed by, for example, untightening the fasteners 241 and the threshing insert 640 may then be coupled to the rotor cage 210 by the fasteners 241. Alternatively, when the threshing insert 240 is hingedly coupled to the rotor cage 210 and the threshing bars 242 are removable, the threshing insert 240 can be pivoted away from the rotor cage 210 to uncover the insert opening 214 and remove the threshing bars 242. The threshing insert 640 may be formed as a curved sheet of metal or polymer, similar to the threshing insert 240, but comprise one or more bushings 641 rather than threshing bars 242. The bushing(s) 641 may fill the insert opening 214 to be substantially flush with the interior surface 211 of the rotor cage 210 when the threshing insert 640 is mounted. Filling the insert opening 214 with the bushing(s) 641 provides a substantially smooth interior surface between the tailings return inlet 212 and the concave 132 where little, if any, threshing of crop material occurs. Thus, it should be appreciated that providing the rotor cage 210 with the insert opening 214 can allow for different threshing performance by mounting the threshing insert 240 with threshing bars 242 that extend through the insert opening 214 or by mounting the threshing insert 640 with bushing(s) 641 that fill the insert opening 214.

Figure 7:
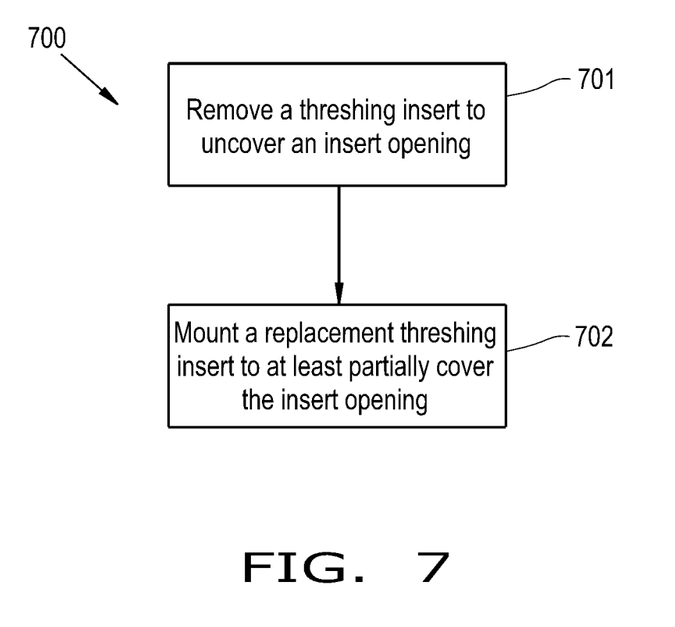
FIG. 7 is a flow chart illustrating an exemplary embodiment of a method for adjusting threshing performance of a threshing and separating system, which is provided in accordance with the present disclosure.

Referring now to FIG. 7, a flow chart illustrating an exemplary embodiment of a method 700 for adjusting performance of a threshing and separating system, such as the previously described threshing and separating system 130 of an agricultural harvester 100, is provided. The method 700 includes removing 701 a threshing insert 240, 640 to uncover an insert opening 214 of a rotor cage 210 of the threshing and separating system 130. Removing the threshing insert 240, 640 may include, for example, untightening the fasteners 241 coupling the threshing insert 240, 640 to the rotor cage. The removed threshing insert may be, for example, the threshing insert 240 including one or more threshing bars 242 that extend through the insert opening 214 or the threshing insert 640 including one or more bushings 641 that are substantially flush with the insert opening 214. After removing 701 the threshing insert 240 or 640, a replacement threshing insert, such as the threshing insert 640 or 240, may be mounted 702 to at least partially cover the insert opening 214. As can be appreciated, the different threshing inserts 240, 640 have different effects on the threshing that takes place within the threshing and separating system 130 during operation, so mounting 702 the replacement threshing insert alters threshing performance of the threshing and separating system 130. It should be further appreciated that different kinds of threshing inserts and replacement threshing inserts can be removed and mounted, respectively, to change threshing performance in a desired manner. Therefore, the method 700 provides a relatively easy and convenient way to adjust threshing performance of the threshing and separating system 130 by changing the threshing insert that is mounted to the rotor cage 210.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A threshing and separating system for an agricultural harvester, comprising:
   a rotor configured to rotate about a rotor axis;
   a rotor cage at least partially enclosing the rotor, the rotor cage comprising a tailings return inlet formed therein that comprises an angled guide lip configured to couple to a tailings return elevator and an insert opening formed therein that is at least partially circumferentially aligned with the tailings return inlet relative to the rotor axis;
   at least one concave coupled to the rotor cage and defining a plurality of concave perforations; and
   a threshing insert removably coupled to the rotor cage, the threshing insert at least partially covering the insert opening and being positioned such that material from the tailings return inlet travels past the threshing insert before reaching the concave.

2. The threshing and separating system of claim 1, wherein the threshing insert comprises at least one threshing bar extending through the insert opening such that material from the tailings return inlet travels past the at least one threshing bar before reaching the concave.

3. The threshing and separating system of claim 2, wherein the at least one threshing bar extends generally parallel to the rotor axis.

4. The threshing and separating system of claim 2, wherein the at least one threshing bar is welded to the threshing insert.

5. The threshing and separating system of claim 2, wherein the rotor cage comprises a smooth interior surface between the insert opening and the concave.

6. The threshing and separating system of claim 1, wherein the threshing insert comprises at least one bushing filling the insert opening.

7. The threshing and separating system of claim 6, wherein the rotor cage defines an interior surface and the at least one bushing is substantially flush with the interior surface.

8. The threshing and separating system of claim 1, wherein the guide lip is exterior of the rotor cage.

9. An agricultural harvester, comprising:
   a chassis;
   a cleaning system carried by the chassis and comprising at least one sieve and a tailings return elevator with an inlet located below the at least one sieve; and
   a threshing and separating system carried by the chassis and comprising:
      a rotor configured to rotate about a rotor axis;
      a rotor cage at least partially enclosing the rotor, the rotor cage comprising a tailings return inlet formed therein that comprises an angled guide lip coupled to the tailings return elevator and an insert opening formed therein that is at least partially circumferentially aligned with the tailings return inlet relative to the rotor axis;
      at least one concave coupled to the rotor cage and defining a plurality of concave perforations; and
      a threshing insert removably coupled to the rotor cage, the threshing insert at least partially covering the insert opening and being positioned such that material from the tailings return inlet travels past the threshing insert before reaching the concave.

10. The agricultural harvester of claim 9, wherein the threshing insert comprises at least one threshing bar extending through the insert opening such that material from the tailings return inlet travels past the at least one threshing bar before reaching the concave.

11. The agricultural harvester of claim 10, wherein the at least one threshing bar extends generally parallel to the rotor axis.

12. The agricultural harvester of claim 10, wherein the at least one threshing bar is removably mounted to the threshing insert.

13. The agricultural harvester of claim 10, wherein the rotor cage comprises a smooth interior surface between the insert opening and the concave.

14. The agricultural harvester of claim 9, wherein the threshing insert comprises at least one bushing filling the insert opening.

15. The agricultural harvester of claim 13, wherein the rotor cage defines an interior surface and the at least one bushing is substantially flush with the interior surface.

16. The agricultural harvester of claim 9, wherein the guide lip is exterior of the rotor cage.

17. A method for adjusting threshing performance of a threshing and separating system of an agricultural harvester, the threshing and separating system comprising a rotor defining a rotor axis and a rotor cage at least partially enclosing the rotor and comprising a tailings return inlet and an insert opening at least partially covered by a threshing insert and at least partially circumferentially aligned with the tailings return inlet relative to the rotor axis, the method comprising:

removing the threshing insert to uncover the insert opening; and mounting a replacement threshing insert to at least partially cover the insert opening, wherein threshing performance of the threshing and separating system is altered by mounting the replacement threshing insert.

18. The method of claim 17, wherein the threshing insert comprises a bushing and the replacement threshing insert comprises a threshing bar.

19. The method of claim 18, wherein the threshing bar extends generally parallel to a rotor axis of a rotor of the threshing and separating system when the replacement threshing insert is mounted.

20. The method of claim 17, wherein the threshing insert comprises a threshing bar and the replacement threshing insert comprises a bushing.

\* \* \* \* \*